United States Patent Office 3,140,603
Patented July 14, 1964

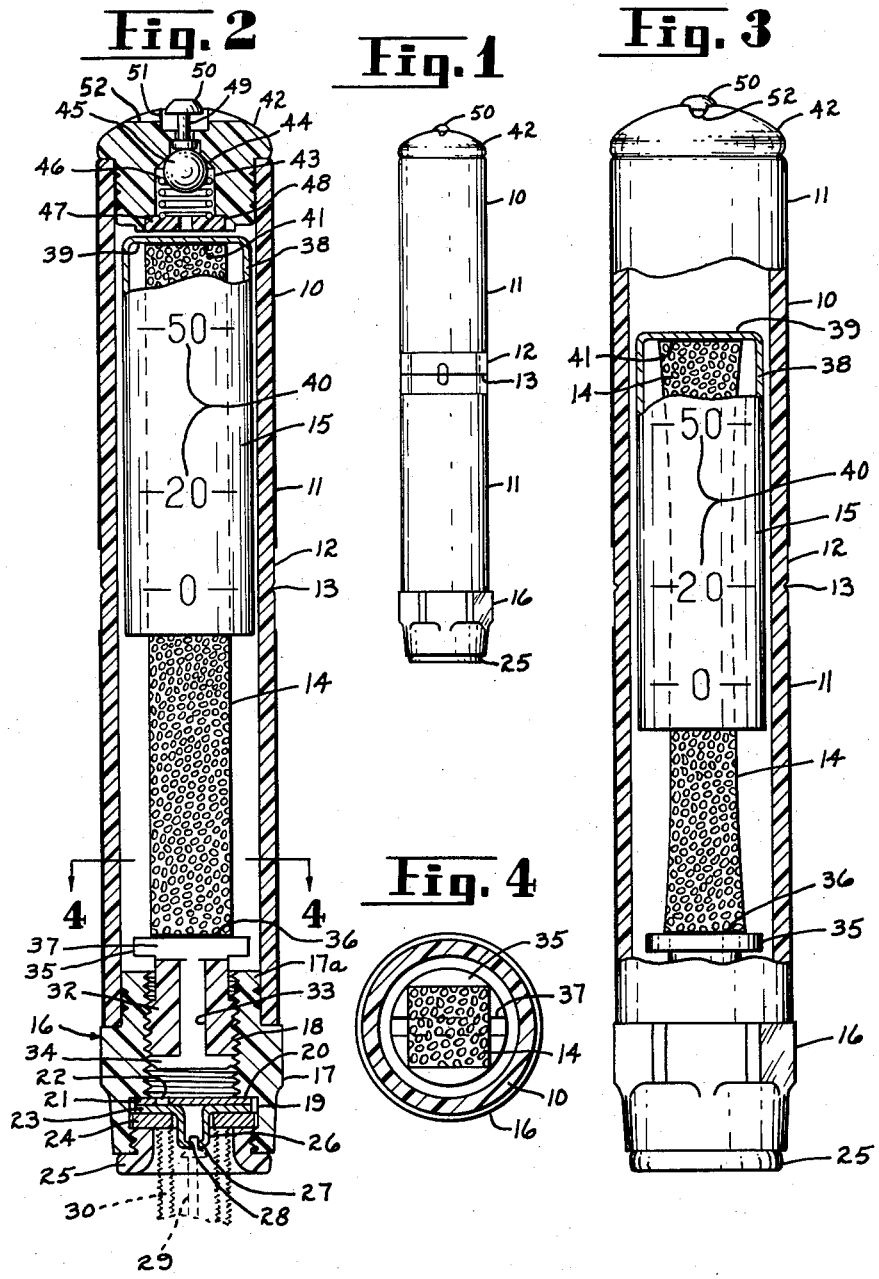

3,140,603
TIRE GAUGE
Selden T. Williams, Middlebury, Conn., assignor to Scovill Manufacturing Company, Waterbury, Conn., a corporation of Connecticut
Filed Aug. 9, 1961, Ser. No. 130,373
5 Claims. (Cl. 73—146.3)

My invention relates to tire pressure gauges of the type adapted to be placed over the valve stem of a tire and which can be removed from the valve stem for reading the indicated pressure.

Gauges of the above type generally employ bellows, diaphragms or pistons as the pressure-responsive element and use a system of links, gears, springs etc. to connect the pressure-responsive element to the indicator. This indicator is very often located externally of the gauge body and therefore, requires some sort of seal to prevent air leakage. The required linkage and seal produce a frictional drag that materially reduces the sensitivity of the gauge, especially at the relatively low pressures used in automobile tires. In addition, the moving parts possess weight and inertia that cause variable results.

The present invention utilizes as the pressure-responsive element a closed-cell elastomeric body such as foam rubber or plastic which is inherently sensitive to low pressure variations. It will be observed that whereas a bellows or the like is subject to cracking or puncturing, thus rendering it useless, a body of foam material, especially where the closed cells are comparatively small and numerous, will continue to function even though some of the cells may be ruptured. The term "foam material" as used herein and in the appended claims, means elastomeric material consisting of a multiplicity of integrally united elastically walled and hermetically closed gas-containing cells. Some uses of and the manner in which such bodies act when subjected to variations in fluid pressure are disclosed in my co-pending application, Serial Number 71,320 filed November 23, 1960, now patent No. 3,045,704.

The general purpose of the present invention is to provide a tire pressure gauge simple in construction, therefore, economical to manufacture and reliable in operation over an extended period of time.

Another object is to provide a gauge in which the pressure-responsive element is located wholly inside an airtight casing, thus obviating the need of friction-producing seals that would reduce the sensitivity of the gauge.

A further object is to eliminate the use of springs or complex linkage between the pressure-responsive element and the indicator to simplify construction and thereby reduce friction and inertia within the gauge, as well as promoting long reliable operation.

Other objects and advantages of the invention will hereinafter more fully appear.

In the accompanying drawing, I have shown for purpose of illustration, one embodiment which the invention may assume in practice. In the drawing:

FIG. 1 is a side elevation of a tire gauge embodying my invention;
FIG. 2 is a vertical sectional view of the gauge on an enlarged scale as it appears in inactive position;
FIG. 3 is an elevational view partially sectionalized showing the gauge subjected to pressure; and,
FIG. 4 is a cross-sectional view taken along the line 4—4 of FIG. 2.

Referring now to the drawing, the numeral 10 designates an elongated hollow casing preferably of tubular shape and made of a transparent plastic material, such as lucite. The major portion of the outer surface of the casing is coated with a non-transparent material such as paint, as indicated at 11, leaving a relatively narrow band 12 near the center of the casing uncoated. At the center of the area 12 a circumferential groove is formed in the transparent casing and may be filled with a colored paint to provide an index line 13. Positioned within the casing 10 is a pressure-responsive member 14 and a scale 15 to be more fully described later.

Located at one end of the casing 10 is a chuck 16 through which pressurized air is directed into the casing and which chuck is provided with a check valve to prevent the escaping of air. The chuck 16 consists of a bushing 17 having a reduced neck 17a secured within the open end of casing 10, preferably by a suitable adhesive material. The bushing 17 is formed with a tapped hole 18 and a valve recess 19 providing a shoulder 20 therebetween.

The check valve is in the form of a rubber disc 21 having a port 22 offset from the central axis of the chuck. The disc 21 is supported on one side by a rigid support plate 23 and a sealing washer 24 is positioned against the opposite surface of said plate 23. The disc 21, the plate 23 and the washer 24 are assembled as a unit into the valve recess 19 and held against the shoulder 20 by a screw nut 25, threadedly engaged in the open end of the valve recess 19.

In order to provide a means to open the tire stem valve 30, the support plate 23 is formed with a central outward tubular projection 26 having its end wall 27 provided with a cross slot 28. The projection 26 is adapted to abut against the valve pin or plunger 29 within the conventional tire valve stem 30 shown in dotted outline in FIG. 2.

The chuck 16 includes an adjustable plug 32 threadedly engaged in the bushing tapped hole 18. The plug 32 has a central opening 33 through which air may flow into the casing 10 and is formed at its outer end with a kerf 34 into which a tool may be fitted for adjusting purposes. The opposite end of the plug 32 is provided with an enlarged platform 35 against which one end of the pressure-responsive member 14 is permanently secured by a suitable adhesive as indicated at 36. The platform is provided with a cross slot 37 to direct air around the end of the member 14.

Considering in more detail the pressure-responsive member 14 and the scale 15, said member 14 is an elongated body of foam material mounted wholly within the casing 10 and preferably square-shaped in cross-section as noted in FIG. 4. With this arrangement, no direct seal is required between the member 14 and the casing 10.

The scale 15 is in the form of an elongated cup-shaped shell 38 having a closed upper end 39. The exterior surface of the shell 38 has suitable pressure-indicating indicia 40 printed thereon, which indicia are adapted to register with the index line 13 of the casing 10 to indicate the tire pressure. The innermost end of the pressure-responsive member 14 is made secure to the inner surface of the closed end 39 of the scale shell 38 by a suitable adhesive as indicated at 41 so that the scale extends over or alongside the member 14, thus permitting the length of the gauge to be kept at a minimum.

The upper end of the casing 10 is closed by a cap or plug 42 secured to said casing, preferably by a suitable adhesive material. The plug 42 carries a manually-operated air release valve. To accommodate said release valve, the plug is provided with a socket 43 having a conical valve seat 44 at one end against which is seated a ball valve 45 normally held thereagainst by a spring 46 held under compression by a washer 47 force-fitted into the counterbore 48. The ball valve 45 is operated to release air pressure in the casing by a plunger pin 49 having an enlarged head 50 partially concealed in a recess 51 in the outer surface of the plug 42. A cross slot 52 is also provided in the outer face of said plug that intercepts the recess 51 so that when the plunger pin head 50 is manually depressed air may escape.

The operation of the tire gauge above described is as follows: The chuck 16 of the tire gauge will be first applied to the end of a tire valve stem in the usual manner wherein the tubular projection 26 of the support plate 23 will depress the tire valve pin 29 with the rubber washer 24 making a seal against the end of the valve stem. Air thus released from the tire will cause the rubber disc 21 to bulge inwardly and open the port 22 to permit the air to pass through the adjustable plug opening 33 and into casing 10. The compressed air in the casing 10 will immediately compress the numerous closed air cells in the member 14 until a balance of pressure is reached between the air cells in the member 14 and the ambient pressure diverted from the tire into the casing 10. This will cause the member 14 to contract in all directions to particularly shorten the over-all length thereof and thereby cause the scale 15 to move with said member 14 within the casing 10, the extent of such movement depending on the pressure.

When the tire pressure is balanced within the casing 10, the gauge may be removed from the valve stem causing the check valve disc 21 to close and confine the tire air pressure within the gauge, whereupon the latter may be moved to a position to facilitate the reading of the gauge as determined by the indicia on the scale shell 38 registered within index line 13 on the casing 10. After a reading is taken, the pressure within the gauge may be released by merely pressing upon the plunger pin head 50. The plug 32 may be adjusted at any time to obtain the correct zero reading.

While only one form of the invention is shown, it will be understood that various changes and modifications may be made within the scope of the following claims.

What I claim is:

1. A tire gauge comprising an elongated air-tight hollow casing having a chuck at one end adapted to be placed on a tire valve stem to admit air from the tire to the casing, a pressure-responsive member consisting of a body of foam material located wholly within said casing and attached thereto at one of its ends, a scale of rigid material attached to the other end and extending alongside said body of foam material for a portion of its length, at least a portion of said casing being transparent and having an index mark co-operating with said scale indicia for indicating the pressure as determined by the position of the scale within the casing.

2. A tire gauge comprising an elongated air-tight hollow casing having a chuck at one end adapted to be placed on a tire valve stem to admit air from the tire to the casing, a pressure-responsive member consisting of a body of foam material located wholly within said casing and attached thereto at one of its ends, a member of rigid material attached to the other end of said body of foam material said member having scale indicia extending along an axis through the ends, at least a portion of said casing being transparent and having an index mark co-operating with said scale indicia for indicating the pressure.

3. A tire gauge as defined in claim 2 wherein said scale comprises a tubular shell surrounding a portion of said body of foam material and having a loose sliding fit within the casing.

4. A tire gauge as defined in claim 2 wherein said chuck has a check valve permitting air to enter the casing but preventing it from escaping and wherein a manually-operated pressure release valve is mounted at the end of said casing opposite said chuck.

5. A tire gauge as defined in claim 2 wherein said chuck has a check valve permitting air to enter the casing but preventing it from escaping and wherein said casing is provided with a manually-operated pressure release valve.

References Cited in the file of this patent
UNITED STATES PATENTS

| | | |
|---|---|---|
| 1,176,907 | Kraft et al. | Mar. 28, 1916 |
| 1,473,171 | Bowden | Nov. 6, 1923 |
| 2,618,977 | Hottenroth | Nov. 25, 1952 |
| 2,909,928 | Streblow | Oct. 27, 1959 |